March 22, 1966      G. ZWEIG      3,241,920
METHOD OF MEASURING ORGANIC CHLORIDE CONTAMINATION OF MILK
Filed Jan. 25, 1962
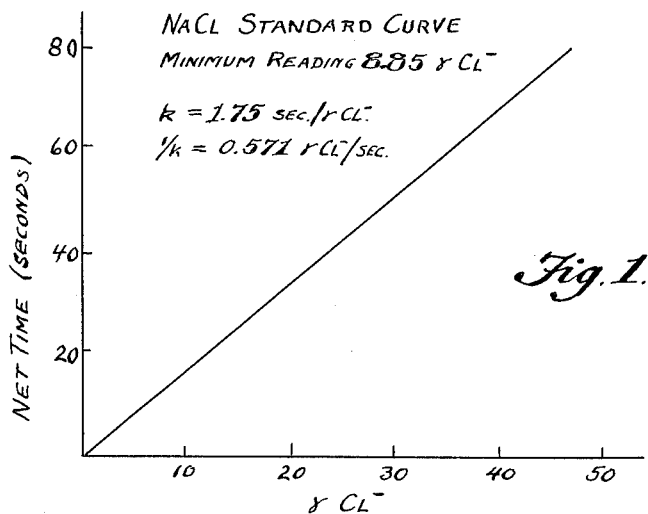
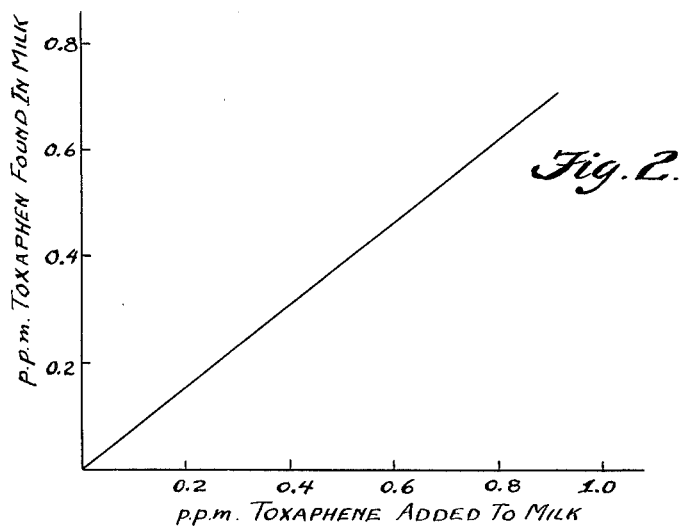
INVENTOR
GUNTER ZWEIG,
BY Joseph Y. Houghton
ATTORNEY

United States Patent Office 3,241,920
Patented Mar. 22, 1966

3,241,920
METHOD OF MEASURING ORGANIC CHLORIDE CONTAMINATION OF MILK
Gunter Zweig, Davis, Calif., assignor to the United States of America as represented by the Secretary of the Department of Health, Education, and Welfare
Filed Jan. 25, 1962, Ser. No. 168,853
1 Claim. (Cl. 23—231)

This invention relates to the detection of halogenated pesticide contamination of dairy products, and aims generally to improve the same. It is particularly, but not exclusively, concerned with the provision of a rapid screening method for chlorinated organic compounds and particularly chlorinated organocyclic compounds, e.g. toxaphene, DDT and the like, in dairy products, and especially in milk.

The methods heretofore employed for the above purposes have been of the colorimetric, total-organic-chlorine, and paper-chromatographic types. In these previous methods the chlorinated compounds had to be removed from the raw milk by solvent extraction. In the method of the present invention the fat portion of the milk is separated by physical means, e.g. mechanically, as by churning, and the organic chloride content of the separated fat is measured as a measure of the organic chloride content of the whole milk. The invention resides in the novel procedures and combinations of procedures hereinafter described and is more particularly pointed out in the appended claims. The invention may also be employed for determining the presence of other organic halides and in other dairy products.

GENERAL DESCRIPTION

A rapid screening method for possible residues of chlorinated pesticides in milk and dairy products is of utmost interest to the food industry. Since there is no established tolerance for any such pesticides in milk, it is necessary to analyze all shipments of raw milk before placing them into the consumer market.

The present invention aims to provide, inter alia a rapid screening method for chlorinated pesticides which may be found in milk. The method is based on the applicant's discoveries that chlorinated pesticide residues in raw milk are concentrated in the butterfat, that the inorganic chloride content of butterfat can be virtually eliminated by a moderate number of water washings, preferably with deionized water, and that the analysis of the butterfat, rather than of the whole milk, thus yields quantitative results. The rapid analysis for "total chloride" may be carried out by the following steps:

(1) Isolation of butterfat, as by churning.
(2) Water washing the butterfat, preferably with deionized water, so as to remove inorganic chloride.
(3) Measurements of the organic chloride content of the so washed butterfat as a measure of the organic chloride content of the whole milk from which the butterfat was obtained, or for other purposes.

This measuring step may be effected in various ways without departing from the scope of the broader aspects of the invention. Thus water washed butterfat may be subjected to (a) Selective removal of fat by sulfuric acid treatment, followed by
(b) Combustion of the washed residue, as in a Schoniger apparatus, and
(c) Titration of the resulting $Cl^-$ in any suitable manner, e.g. with the aid of a semi-automatic $Ag^+$ generator.

Another way in which step 3 above may be performed is by analyzing the total organic chloride content of the water-washed butterfat by neutron-activation-analysis, for example.

The present invention has shown that butterfat, rather than whole milk, may be used satisfactorily for "milk analysis" thus substituting a mere physical separation, e.g. by churning, for a solvent-extraction process, and also that by a simple water-washing step, the inorganic chloride content of butterfat, e.g. of a commercial sample, may readily be reduced from a value of the order of 13,000 p.p.m. to a value of the order of 1.5 p.p.m. With the foregoing general introduction the invention will be best understood by reference to the following specific examples of each of the above outlined embodiments, bearing in mind that the invention contemplates variations and modifications in the quantities of materials and particular procedures and equipment set forth, as will be evident to one skilled in the art from the present specification as a whole.

EXAMPLE 1

In this example, the butterfat is mechanically separated from the milk and after suitable treatment is reacted with fuming sulfuric acid and the acid stable pesticides remaining are extracted with aid of a suitable solvent, preferably a liquid alkane solvent, e.g. hexane in the present example. The concentrated extract is then combusted by Schoniger's method and the chloride is determined with a semi-automatic titrator. The apparatus employed, for convenience may comprise:

(a) A Thomas-Schoniger microcombustion apparatus;
(b) A chloridometer, or semi-automatic chloride titration apparatus;
(c) A Burrell wrist-action shaker; and
(d) A Kuderna-Danish evaporating apparatus.

The reagents conveniently employed in this example are:

Nitric acid-acetic acid solution; 3.2 ml. conc. nitric acid, 50 ml. glacial acetic acid, 450 ml. deionized water.

Gelatin reagent; 6.2 g. of a dry mixture containing gelatin, water-soluble thymol-blue, and crystalline thymol (60:1:1, w./w.) is dissolved in one liter of hot water.

Sodium chloride; stock solution (0.1 M; 5.8450 g. reagent-grade sodium chloride in 1,000 ml. of deionized water, dilute solution; 5.0 ml. of stock solution in 1,000 ml. of acid reagent, so that 1 ml. is equivalent to 17.75 micrograms.

The procedure employed is as follows:

(a) One-liter samples of raw milk are put into one-liter separatory funnels and are placed in a cold room (4° C.) for 24 hours or until the cream separates from the milk.

(b) The milk is carefully drawn off; the cream left in the separatory funnel is transferred into a 250 ml. Erlenmeyer flask. The cream is shaken on a Burrell shaker for 10 minutes, until butter chunks are obtained.

(c) A double layer of cheese cloth is placed over a funnel and the butter chunks are put on the cheese cloth.

Ice-cold distilled water is poured over the butter chunks, and the cheese cloth is squeezed to drain out the water. (The water removes water-soluble proteins and inorganic chloride ions from the butter.) Water washings are continued until a clear filtrate is obtained. The so washed butter is then treated as follows:

(d) Melt the butter in a 240 ml. beaker placed in a 70° C. oven. Centrifuge about 20 ml. of the hot butterfat at 1500 r.p.m. for five minutes. Precipitated protein remains as a sediment. The supernatant is carefully decanted and filtered through Whatman No. 1 paper. This filtration is carried out in an oven at 70° C.

(e) Dissolve ten milliliters of the butterfat (8.6 g.) in 250 ml. of "mixed hexane" and place this solution in a 500 ml. separatory funnel.

(f) Wash the so prepared hexane solution with 15 ml. of a mixture of fuming sulfuric acid-concentrated sulfuric acid (1:2, v./v.). Drain off the bottom layer.

(g) Repeat the acid-wash five more times.

(h) Wash the resultant hexane solution, keeping it always in the same separatory funnel, with 100 ml. portions of distilled demineralized water, until the pH of the washes returns to neutrality. This requires six to seven washings.

(i) Reduce the volume of the hexane solution to about 50 microliters, e.g., by evaporation on a steam bath in the Kuderna-Danish apparatus. Simple steam-evaporation may be employed if desired.

(j) Dissolve the residue (about 50 microliters) in several drops of hexane and transfer quantitatively with a micropipet to the paper carrier of the Schoniger combustion apparatus.

(k) Place 0.5 ml. of 0.1 N NaOH in bottom of combustion flask and flush with oxygen for 30 seconds.

(l) Ignite the paper tail of the carrier, place in the flask immediately, and wait for 10 minutes, so that all of the released hydrochloric acid has reacted with the base.

(m) Break the vacuum of the flask by pipetting 1.0 ml. of acid solution around ground-glass neck of flask.

(n) Add another 0.5 ml. of the acid solution to the flask and transfer a measured aliquot (about 1.5 ml.) to the titration vial of the chloridometer.

(o) Add an additional 0.5 ml. of the acid solution and a drop of gelatin reagent to the vial.

(p) Titrate at "low rate" to the automatic endpoint. Read "time" in tenths of seconds.

(q) Determine titration blank for all reagents and paper carrier by following steps (j) through (p).

(r) Obtain standard curve for NaCl (see FIGURE 1).

(s) Obtain standard curve for toxaphene (68% Cl), following steps (j) to (p). Subtract blank obtained in (q) and plot micrograms toxaphene against seconds (see FIGURE 2).

Calculations:

Read net "time" of unknown sample on standard curve and calculate residue as p.p.m. based on fat.

RESULTS AND DISCUSSION

The determination of organic chlorine after combustion of the extracted sample presents certain problems. The cumbersomeness of the combustion step and the erratic behavior of the electrode for direct potentiometric reading made the total chlorine technique less attractive for routine analyses. However, the total organic chlorine method offers the prospect of a rapid screening technique for many chlorinated pesticides. Furthermore, an important pesticide, toxaphene, is especially amenable to this type of determination since the commercial product is composed of a number of compounds.

The recently developed simple Schoniger combustion technique and semi-automatic chloride titration apparatus are especially suitable for micro-analysis of chlorinated pesticide residues.

The standard curve for inorganic chloride ranging from 10-40 micrograms $Cl^-$ is shown in FIGURE 1. The reagent blank gave consistent readings of $6.2 \pm 0.1$ seconds. Combustion of standard amounts of toxaphene in a Schoniger flask and titration with $Ag^+$ ions, generated coulometrically, gave recoveries ranging from 81-102% (Table I).

TABLE I

*Total-organic-chloride determination toxaphene recovery studies*

| Sample | Titration Time | | Toxaphene Expressed as $Cl^-$ | | Percent Recovery |
|---|---|---|---|---|---|
| | Gross, sec. | Net, sec. | Added, micrograms | Found, micrograms | |
| Blank (1) [1] | 13.2 | | | | |
| Blank (2) | 15.3 | | | | |
| 11.6 micrograms Tox. | 26.5 | 11.2 | 7.9 | 6.4 | 81 |
| 26.4 micrograms Tox. | 44.4 | 29.1 | 18.0 | 16.6 | 92 |
| 49.5 micrograms Tox. | 70.6 | 55.3 | 33.7 | 31.6 | 94 |
| 99.0 micrograms Tox. | 136.1 | 120.8 | 67.3 | 69.0 | 102 |

[1] Blanks are duplicate determinations. Blank (1)=paper blank. Blank (2)=reagent plus paper blank.

The smallest significant amount of toxaphene detected by this technique was 11.6 micrograms. A standard curve based on this method resulted in a straight line (FIGURE 2).

For a rapid screening technique the acid clean-up of fats is preferred. This method also requires a minimum of glassware and extraction steps. Toxaphene and DDT give a minimum of decomposition under this treatment as observed by recovery studies and paper chromatography. Table II shows the recovery of varying amounts of toxaphene added to butterfat. These recoveries ranged from 88-120% when 1.7-5 p.p.m. toxaphene were added directly to the butterfat. High recoveries may be due to some evaporation of hexane during the process, and may be evaluated by known methods.

TABLE II

*Toxaphene recovery studies on butterfat*

| Aliquot of fat analyzed, ml. | Titration Time | | Toxaphene | | Percent Recovery |
|---|---|---|---|---|---|
| | Gross, sec. | Net, sec. | Added, micrograms | Found, micrograms | |
| 6.3 | 17.8 | | 18.2 | 16.0 | 88 |
| 5.5 | 36.9 | 19.1 | 22.9 | 27.4 | 120 |
| 5.5 | 50.4 | 32.6 | 25.0 | 24.0 | 96 |
| 6.0 | 46.4 | 28.6 | 23.4 | 24.5 | 105 |
| 5.6 | 47.0 | 29.2 | 24.2 | 29.7 | 123 |
| 5.8 | 53.2 | 35.4 | 25.0 | 24.5 | 98 |
| 6.0 | 50.0 | 32.2 | 8.4 | 8.6 | 102 |
| 5.0 | 28.0 | 10.2 | | | |

In order further to evaluate this screening method, a number of butterfat samples, obtained from low-level DDT feeding trial, were analyzed for total organic chlorine. Concentration of $Cl^-$, expressed as p.p.m. DDT ranged from 0.5 to 2.6 p.p.m. (Table III).

TABLE III

*Total organic chloride determination of butterfat samples*

(6.5 g. aliquots analyzed)

| Sample | Cl⁻ Found | | Expressed as p.p.m. DDT |
|---|---|---|---|
| | Net Titration Time [1] | Micro- grams | |
| 194 B-8 | 9.4 | 5.4 | 1.7 |
| 204 F-8 | 13.3 | 7.6 | 2.3 |
| 246 G-8 | 5.9 | 3.4 | 1.0 |
| 162 E-8 | 7.5 | 4.3 | 1.3 |
| 137 H-8 | 4.5 | 2.6 | 0.8 |
| 1140 C-8 | 10.1 | 5.8 | 1.8 |
| 1154 H-8 | 15.1 | 8.6 | 2.6 |
| 1192 I-8 | 3.0 | 1.7 | 0.5 |
| 1164 I-8 (3.25 g. aliquot) | 5.9 | 3.4 | 2.1 |

[1] Average of 15.3 seconds is used obtained from solvent-paper blank.

Table III is a summary of the results from nine different butterfat samples which were also determined qualitatively by paper chromatography. Traces of DDT and its metabolites DDD and DDE could be detected. This was taken as evidence that at least part of the organic chlorine which was found was actually due to some chlorinated pesticides. Results from fortified butter samples are in good agreement with those obtained by neutron-activation analysis (Table IV).

TABLE IV

*Toxaphene analysis of butterfat*

| Sample | P.p.m. Cl | | | |
|---|---|---|---|---|
| | Added | Found | | |
| | | N.A.A. | | Combustion, net |
| | | Gross | Net | |
| BA | 0 | 1.4 | 0 | 0 |
| BB-025 | 1.52 | 3.2 | 1.8 | 1.5 |
| BB-050 | 3.02 | 4.7 | 3.3 | 2.5 |
| BB-100 | 6.05 | 7.5 | 6.3 | 4.3 |

The same acid-cleanup as described above may also be used for the quantitative paper chromatographic determination of DDT. It is recommended, therefore, to combine the total-chlorine and paper chromatography techniques for those samples which show a seemingly high residue in a preliminary analysis.

EXAMPLE 2

In this example, the butter is separated from the milk by churning. The water-washing step is effected by a modified procedure. The total organic chloride content of the so washed butter is also determined by a different specific procedure, i.e. by neutron-activation-analysis.

Briefly the neutron activation procedure consists of irradiating butterfat in a nuclear reactor for a short period of time and subsequently measuring the induced $Cl^{38}$ radioactivity. Chlorinated insecticides are chiefly aryl organic molecules that have attached chlorine atoms. For example, the insecticide DDT is 50% chlorine by weight and only about 18% chlorine in atom percent; the insecticide toxaphene is 68% chlorine by weight and about 30% chlorine in atom percent. These chlorinated molecules present in fodder are ingested by animals and subsequently released in milk by animals such as cows. Determinations of these toxic insecticides in the fat phase of milk (about 3.5 to 5%) or in the butterfat in butter, a derivative of milk, yields the total of such insecticide content of milk. The neutron activation analysis procedure may be applied for a quick screening test for insecticides in milk and its derivatives, such as cheese, ice cream, etc.

Neutron activation analysis of chlorine induces radioactivity in chlorine nuclei. Both isotopes of chlorine, $Cl^{35}$ and $Cl^{37}$, absorb thermal neutrons and become $Cl^{36}$ and $Cl^{38}$, respectively. The former, $Cl^{36}$, has a half-life of $3 \times 10^5$ years while $Cl^{38}$ has a half-life of 37.3 minutes. In one half-life, 50% of all the radioactive nuclei decay or disintegrate into more stable nuclei or atoms. Furthermore, since the number of radioactive disintegrations is inversely proportional to the half-life of the species it becomes clear that the radioisotope, 37.3 minute $Cl^{38}$, is pertinent for neutron activation analysis of chlorine. It might be noted that the long-lived radioisotope, $3 \times 10^5$ year $Cl^{36}$, is useful for tracer studies where the involved times are over many hours or days. Decay of 37.3 min. $Cl^{38}$ takes place via emission of energetic beta particles (electrons) and accompanying gamma rays (photons with large energies) of 2.16 and 1.61 mev. (million electron volts) energies. The resultant atom or nucleus from decay of 37.3 min. $Cl^{38}$ is $Ar^{38}$, a stable atom.

Radioactivity of $Cl^{38}$ is usually recorded by a standard NaI (Tl) scintillation spectrometer, which detects the highly energetic 2.16 mev. and 1.61 mev. gamma rays of $Cl^{38}$. Other radioactivities are easily discriminated against with a scintillation spectrometer.

When exposed to a neutron flux of $1.8 \times 10^{12}$ neutrons/cm.²/sec. for 15 minutes, the induced radioactivity of 37.3 min. $Cl^{38}$ is 0.03 microcurie per microgram of natural chlorine, i.e., about $6 \times 10^4$ disintegrations of $Cl^{38}$ per minute at the end of neutron irradiation. Since 500 disintegrations per minute may be detected by scintillation spectrometric techniques, it is evident that sensitivites of 10 p.p.b. (parts per billion) of natural chlorine by weight are achieved.

In addition to the induced radioactivity in chlorine atoms, neutron activation analysis of butterfat also induces radioactivities in other elements that are present in fat. Radioactivities induced by neutron absorption in the main constituents, hydrogen, oxygen, and carbon are completely negligible. The other elements present in milk and butterfat, Na, K, Ca, Mg, Fe, S and P absorb thermal neutrons and become radioactive. However, their resultant radioactivities are immensely reduced by separation of the organic and inorganic constituents prior to neutron irradiation and are also reduced sharply by discriminately detecting the prominent $Cl^{38}$ gamma rays.

The total organic chloride content in butterfat in this example in determined by comparing directly the induced $Cl^{38}$ radioactivity in a butterfat specimen (no inorganic chloride present) and in a chlorine standard ($NH_4Cl$ solution) that are exposed to the same thermal neutron bath or flux. It is essential that the neutron spectrum is identical in the two samples; therefore, the hydrogen densities in the samples should be nearly identical in order to avoid unnecessary calibration of chlorine neutron captures as a function of hydrogen densities. The developed procedure, reported herein, has obviated such calibrations.

Ordinary butter contains about 13,000 micrograms of inorganic chlorine per gram of butter and an estimated 1 p.p.m. or so of organic chlorine as chlorinated insecticides. Two water washings with hand stirring of the water and the melted butter reduced the chloride content to about 8 p.p.m. Two more 10 cc. water washes of a few grams of melted butter reduced the total chloride content to about 2 p.p.m. A few more water washings reduced the chloride content to about 1.5 p.p.m. Such a slight reduction in chloride content from 8 to 2 to 1.5 p.p.m. was attribtued to incomplete mixing of the fat and water phases (compare the squeezing technique employed in Example 1). To effect better mixing and complete inorganic chloride removal in a few water washes, ultrasonic energy was used in conjunction with hand stirring in this example. With ultrasonic energy and hand stirring, the total chloride in salted butter was reduced from an initial value of about 13,000 p.p.m. to 1.0 p.p.m. for four or six washings.

The total organic chloride content (shown in Table V) was determined in butter as a function of butter mass and number of water washes with an ultrasonic device.

TABLE V

*Total organic chloride content in butter by neutron activation analysis* [1]

| Grams of Butter | No. of 10 cc. Water Washes | Total Organic Chloride, p.p.m. |
|---|---|---|
| 2.23 | 4 | 1.0 |
| 2.33 | 4 | 1.1 |
| 2.45 | 6 | 0.9 |
| 2.30 | 6 | 1.1 |
| 2.27 | 6 | 0.8 |
| 2.16 | 6 | 0.9 |
| 4.2(1.60) [2] | 4 | 1.1 |
| 4.2(1.94) [2] | 4 | [3] 1.6 |
| 4.2(1.87) [2] | 4 | 0.9 |
| 4.2(1.82) [2] | 4 | 1.1 |
| Average | | 1.0±0.1 p.p.m. |

[1] The butter samples were water washed in an ultrasonic bath before irradiations. The samples and chloride standards were irradiated for 15 minutes in a neutron flux of $1.5 \times 10^{12}$ cm.$^{-2}$ sec.$^{-1}$ in a Triga reactor.
[2] Water washes were done on pads of butter, about 4.2 grams each. The weights in parenthesis are the exact amounts of butterfat that were irradiated.
[3] This value was not included in the average because of possible chloride impurity in the polyvial.

The data clearly indicate that four water-washes are sufficient for total inorganic chloride removal and that at least 4 grams of butterfat may be easily processed by this procedure. Also, the reproducibility in the total organic chloride of 1.0±0.1 p.p.m. in this particular batch of butter is quite consistent. For this butter, the total DDT insecticide content would be 2.0 p.p.m. or the total toxaphene insecticide content would be calculated to be 1.5 p.p.m.

Since all organic compounds have a finite (though small) solubility in water, it is desirable to determine under the conditions employed the partition coefficient of the representative insecticides DDT and toxaphene in water and the fat phase. The conditions and results in this example are listed in Table VI.

TABLE VI

*Total organic chloride content in DDT and toxaphene (TPH) spiked butter by neutron activation analysis* [1]

| Grams of Butter | No. of 10 cc. H₂O washes | Added DDT of TPH in p.p.m. | Calc. Total Organic Cl in Micrograms | Obs. Total Cl in Micrograms | Ratio of Obs. Cl: Calc. Cl |
|---|---|---|---|---|---|
| 4.59 | 4 | DDT, 0.78 | 6.4 | 6.3 | 0.99 |
| 4.13 | 4 | DDT, 0.86 | 5.9 | 6.1 | 1.03 |
| 4.23 | 4 | DDT, 0.99 | 6.3 | 9.7 | [2] 1.54 |
| | | | | | 1.01±0.02 |
| 4.15 | 4 | DDT, 37.6 | 82.1 | 76.5 | 0.93 |
| 4.65 | 4 | DDT, 30.4 | 75.4 | 79.1 | 1.05 |
| 4.56 | 4 | DDT, 31.3 | 76.2 | 75.1 | 0.99 |
| | | | | | 0.99±0.05 |
| 5.08 | 4 | TPH, 1.25 | 9.3 | 9.0 | 0.97 |
| 4.42 | 4 | TPH, 1.84 | 9.8 | 9.1 | 0.93 |
| 4.78 | 4 | TPH, 1.54 | 9.6 | 8.6 | 0.90 |
| | | | | | 0.93±0.03 |
| 4.71 | 4 | TPH, 14.7 | 50.4 | 46.3 | 0.92 |
| 4.71 | 4 | TPH, 14.7 | 50.4 | 44.6 | 0.89 |
| 4.83 | 4 | TPH, 14.8 | 51.9 | 50.1 | 0.97 |
| | | | | | 0.93±0.03 |

[1] The butter samples were water washed in an ultrasonic bath before neutron irradiation. Samples and chloride standards were irradiated in a neutron flux of $1.8 \times 10^{12}$ cm.$^{-2}$ sec.$^{-1}$ for 15 minutes in a Triga reactor.
[2] Because of chloride contamination, this value was not included in the average.

The quantities of added DDT varied from about 0.9 to about 32 p.p.m. (i.e., about 0.45 to 16 p.p.m. of added organic chloride), while concentrations of added toxaphene varied between 1.6 and 14 p.p.m. (1.1 and 9 p.p.m. of organic chloride, respectively). Columns 4 and 5 list the calculated and observed total organic chloride and column 6 gives the ratio of the observed to calculated chloride content for DDT and TPH. The partition coefficients in fat to water phases calculated from the data listed in the last column are found to be greater than 20/1 and greater than 13/1, respectively. Less than 1% DDT and 2% TPH is lost in every water wash and these corrections may be applied confidently to the observed organic chloride values.

An alternative and simpler method for the extraction of all inorganic chloride from butterfat is as follows: After the protein is removed from the butter by a single hand stirred water wash, butterfat (3.0 ml.) is dissolved in about 7 cc. of pure heptane (or pure mixed hexane). The background organic chloride content in pure heptane or pure mixed hexane has been determined by neutron activation analysis at about 50 p.p.b. or less. All inorganic chloride is extracted into 10 cc. of demineralized water by vigorously shaking the butterfat-heptane-water mix with an automatic shaker (about 300 shakes per minute). (Burrell) Two 2-minute shaking periods are required for total removal of all inorganic chloride. Since (a) the total organic chloride determined by neutron activation of the butterfat-heptane-water autoshake procedure was identical to that determined by the butterfat-ultrasonic-water procedure on the same butterfat, and (b) six 5-minute autoshaking periods removed the same quantity of inorganic chloride as two 1-minute autoshaking periods, it is fair to conclude that all the inorganic chloride is removed from the butterfat-heptane phase by two 2-minute autoshaking periods (see Table VII).

TABLE VII

*Total chloride content in butter by neutron activation analysis*

| Butter A | | | |
|---|---|---|---|
| Proc. I | | Proc. II | |
| Hand stirring of melted butter plus 10 cc. water | | Procedure I and ultrasonic energy | |
| Washes | Cl, p.p.m. | Washes | Cl, p.p.m. |
| 0 | about 13,000 | 0 | about 13,000 |
| 2 | about 8 | 2 | about 8 |
| 4 | 2 | 4 | 1.0±0.1 |
| 6 | 1.5 | 6 | 1.0±0.1 |
| Butter B | | | |
| Proc. II | | Proc. III | |
| Procedure I and ultrasonic energy | | Butterfat heptane 10 cc. water autoshaking | |
| Washes | Cl, p.p.m. | Washes | Cl, p.p.m. |
| | | 2 1-min. | 1.3±0.1 |
| | | 2 3-min. | 1.4±0.1 |
| 4 | 1.3±0.1 | 2 5-min. | 1.3±0.1 |
| | | 4 5-min. | 1.3±0.1 |
| | | 6 5-min. | 1.2±0.1 |

Final procedure for inorganic chloride extraction is two 2-min. autoshaking of butterfat heptane (or mixed hexane) and water phases.

Because of the simplicity of the butterfat-heptane (or hexane)-water autoshake procedure, that procedure has been adopted for routine inorganic chloride removal.

This neutron activation procedure offers several distinct advantages for the determination of total organic chloride and thereby, insecticide content in milk and its derivatives: (a) Chiefly, the extremely low sensitivity for chloride allows a screening for greater than 10 p.p.b. of chlorinated insecticides. The sensitivity of this method is about 10 p.p.b. of total organic chloride. With higher neutron fluxes, the sensitivity is proportionately increased;

that is, the total organic chloride (and in turn the calculated concentrations of chlorinated insecticides or other chlorinated organic molecules) sensitivity is inversely proportional to the neutron flux. The procedure described above is also applicable for the determination of the total organic bromide or iodide concentration (and in turn the calculated concentrations of brominated or iodinated organic molecules of insecticides, etc.) in butterfat, fat, or water insoluble compounds (see Table VIII).

TABLE VIII

*Neutron induced radioactivity in chlorine, bromine, and iodine*

$Cl^{35}+n \rightarrow Cl^{36}$  $t_{1/2}=3.2 \times 10^5$ years, beta, emission
$Cl^{37}+n \rightarrow Cl^{38}$  $t_{1/2}=37.3$ min., beta, gamma, emission
$Br^{79}+n \rightarrow Br^{80}$  $t_{1/2}=18.5$ min., beta, gamma, emission
$Br^{81}+n \rightarrow Br^{82}$  $t_{1/2}=36$ hr., beta, gamma, emission
      gamma-rays 0.55 mev., 0.77 mev.
$I^{127}+n \rightarrow I^{128}$  $t_{1/2}=25$ min., beta, gamma, emission
      gamma-rays 0.46 mev.

(b) The time required for such an analysis is less than an hour for a single specimen and fractions of an hour per butter specimen if many specimens are processed simultaneously. The method of neutron activation is also applicable in the analysis of chlorinated or brominated pesticides in foods and fodder, viz., leafy vegetables and alfalfa. In brief, the procedure employed in this embodiment consists of extracting organic chlorinated (or brominated, etc.) pesticides from the food or fodder matrix, by a pure solvent such as mixed hexane, volatilizing most of the solvent, and neutron activating the resultant reduced solvent volume. Organic phosphorus containing pesticides may be determined by neutron activation in the p.p.m. range.

As shown in Table IX the total organic chloride may be determined using any suitable solvent, e.g. an alkane liquid solvent such as heptane or mixed-hexanes, as the organic phase.

TABLE IX

*Comparison of the total organic chloride observed in butterfat via heptane-water-autoshake and the mixed-hexane-water-autoshake neutron activation methods* [1]

Hexane-water-autoshake __ 0.81±0.06 microgram of total organic chloride/cc. of butterfat.
Heptane-water-autoshake __ 0.83±0.03 microgram of total organic chloride/cc. of butterfat.

[1] The butterfat used was the same throughout these experiments.

As shown in Tables X and XI the mixed-hexane-water-autoshake procedure determines quantitatively the total organic chloride content in a butterfat phase.

TABLE X

*Total organic chloride content in toxaphene and DDT spiked butterfats by neutron activation analysis* [1]

| Butterfat | Total Organic Chloride Added | Total Same Found [2] |
|---|---|---|
| 2.46 gms | 6.7 micrograms as toxaphene | 7.1±1.2 microgm. Cl-. |
| 2.46 gms | 4.6 micrograms as DDT | 5.1±0.6 microgm. Cl-. |

[1] Via two 2-minute cycles of autoshaking of butterfat, mixed hexane, and water phases. Duplicate analyses for each result.
[2] A total organic chloride background of 3.1±0.4 micrograms due to 2.46 grams butterfat blank and the 7 cc. of mixed hexane has been subtracted.

TABLE XI

*Total organic chloride content in toxaphene spiked unsalted butter by neutron activation analysis* [1]

| Butterfat (gm.) | Total Organic Chloride Added As Toxaphene, Micrograms Cl/cc.[2] | Total Organic Chloride Found, Micrograms Cl/cc.[3] |
|---|---|---|
| 2.46 | 1.52 | 1.8±0.2 |
| 2.46 | 3.02 | 3.3±0.4 |
| 2.46 | 6.05 | 5.2±0.9 |

[1] Via two 2-minute cycles of autoshaking of butterfat, 7 cc. of mixed hexane, and water phases. Duplicate analyses for each sample.
[2] Butters spiked at Davis, California.
[3] Total organic chloride background in the butterfat of 1.4±0.1 microgram Cl/cc. and of 0.56 microgram Cl/cc. of mixed hexanes were subtracted to obtain the net organic chloride values.

The determination of the organic chloride content of butter, butterfat, etc., by the alkane solvent (e.g. hexane or heptane)-butterfat-water-autoshake procedure, in one specific embodiment is effected as follows:

(1) Place about 7 to 10 cc. of butter in a conical centrifuge tube and add about 10 ml. of water (demineralized). Place in a water container on a hot plate to melt the butterfat. Stir with a clean rod (glass) for about 20 seconds to cause precipitation and settling of the protein. Centrifuge the tubes.

(2) Pipette 3.0 ml. of clear butterfat (the pipette should be placed near side of test tube and above the protein phase) into 7 ml. of heptane (or pure mixed hexanes) having less than 0.5 microgram Cl per 7 ml., that is in a 60 ml. cylindrical separatory funnel (with Teflon stopcock and solid pennyhead stoppers). The stopcock should be tight to prevent solution loss on shaking.

(3) Add about 10 ml. demineralized water and place a piece of ½ inch masking tape about 8 inches long over the stopper to hold it in place while in the autoshaker.

(4) Place in autoshaker and shake for 2 minutes (Burrell wrist-action-shaker, Model BB, about 300–180° out of phase shakes over a 2″ half shake).

(5) Remove half of the masking tape to remove the stopper. Carefully open the stopcock to drain the water until the butterfat just touches the Teflon. Close the Teflon stopcock and add (squirt in) a few ml. of water. Again let out water until butterfat just touches the Teflon.

(6) Add about 10 ml. water and replace stopper and tape. Autoshake again for 2 minutes. Again remove the stopper and drain water until the butterfat just touches the Teflon. Again squirt in about 5 ml. water and again drain water until the butterfat touches the Teflon.

(7) Drain heptane-butterfat into a 4 dram polyethylene vial. Heat-seal the vial. Prepare a chlorine standard (about 30 micrograms Cl) in a 4 dram polyvial and bring up to volume of butterfat-heptane polyvial. Also prepare 7 ml. heptane (or hexane background) in a polyvial. To prevent organic chloride uptake in the polyvial, transfer the heptane-butterfat to the vial in less than one hour before irradiation.

(8) Irradiate in Triga at 250 kw. for 15 minutes.

(9) After irradiation, transfer all samples to unirradiated polyvials. Heat-seal and take a gamma-ray spectra with a multichannel gamma-ray spectrometer (3″ x 3″ NaI(Tl) solid crystal).

(10) Calculate the total chloride in the butterfat by comparing the 2.16 mev. peak heights. Three (3.0) ml. of butterfat corresponds to 3.0 gm. of salted butter.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

The invention described herein, if patented, may be manufactured and used by or for the government of the United States for governmental purposes without the payment to me of any royalty thereon in accordance with the provisions of the Act of March 3, 1883 as amended (35 U.S.C. 266).

I claim:

The method of estimating the content of organic chloride residues in milk which comprises
(a) mechanically separating the butterfat from the aqueous phase of the milk,
(b) then without converting to inorganic chloride the organic chloride content of the so separated butterfat desalting the same by reducing the inorganic chloride content thereof to a value of the order of 1.5 p.p.m. by water washing the same,
(c) then melting, centrifuging and filtering the desalted butterfat produced by step (b), and
(d) then measuring the chloride content of the so treated desalted butterfat as a measure of the organic chloride content of the milk.

References Cited by the Examiner

Anal. Chem., vol. 19, January 1947, No. 1, pages 51–54.
Allen: Commercial Organic Analysis, 5th ed., vol. II, P. Blakistons & Sons.

MORRIS O. WOLK, *Primary Examiner.*

JAMES H. TAYMAN, JR., *Examiner.*